(12) United States Patent
Burgin et al.

(10) Patent No.: US 6,211,295 B1
(45) Date of Patent: Apr. 3, 2001

(54) POLYOLEFIN COMPOSITIONS AND BLOWN FILMS OBTAINED THEREFROM

(75) Inventors: Emanuele Burgin, Zola Predosa (IT); Claude Palate, Brussels; Pierre Coosemans, Hoeilaart, both of (BE)

(73) Assignee: Montell Technology Company by Hoofddorp (NL)

( * ) Notice: Subject to any disclaimer, the term of this patent is extended or adjusted under 35 U.S.C. 154(b) by 0 days.

(21) Appl. No.: 09/140,851

(22) Filed: Aug. 27, 1998

Related U.S. Application Data

(63) Continuation-in-part of application No. 08/753,785, filed on Dec. 2, 1996, now abandoned.

(30) Foreign Application Priority Data

Dec. 1, 1995 (IT) .............................................. MI95A2525

(51) Int. Cl.⁷ .............................. C08F 8/00; C08F 23/00; C08F 23/04
(52) U.S. Cl. .......................... 525/191; 525/240; 525/323
(58) Field of Search .................................... 525/191, 240, 525/323

(56) References Cited

U.S. PATENT DOCUMENTS

| | | | |
|---|---|---|---|
| 5,368,919 | * | 11/1994 | Robeson . |
| 5,414,027 | * | 5/1995 | DeNicola, Jr. et al. ............. 522/112 |
| 5,508,318 | * | 4/1996 | Comer ................................... 522/112 |
| 5,508,319 | * | 4/1996 | DeNicola, Jr. et al. ............. 522/161 |
| 5,554,668 | * | 9/1996 | Scheve et al. ........................ 522/157 |
| 5,594,070 | * | 1/1997 | Jacoby et al. ........................... 525/88 |

FOREIGN PATENT DOCUMENTS

| 28 38 636 | * | 3/1979 | (DE) . |
|---|---|---|---|
| 958079 | * | 5/1964 | (GB) . |

* cited by examiner

*Primary Examiner*—Nathan M. Nutter
(74) *Attorney, Agent, or Firm*—Bryan Cave LLP

(57) ABSTRACT

Polyolefin compositions comprising:

A) a heterogeneous polyolefin composition itself comprising a fraction (A1) which is insoluble in xylene at room temperature and a fraction (A2) which is soluble in xylene at room temperature; and B) a branched propylene polymer.

The said compositions are particularly processable when used in the process for the preparation of blown films. The films obtained by the said process are moreover characterized by excellent mechanical properties.

10 Claims, No Drawings

POLYOLEFIN COMPOSITIONS AND BLOWN FILMS OBTAINED THEREFROM

This is a continuation-in-part of U.S. application Ser. No. 08/753,785, filed Dec. 2, 1996 now abandoned.

The present invention relates to polyolefin compositions which are particularly suitable for use in the preparation of blown films with improved mechanical properties. In particular, the present invention relates to polyolefin compositions comprising: (A) a heterogeneous polyolefin composition itself comprising a fraction (A1) which is insoluble in xylene and a fraction (A2) which is soluble in xylene, and (B) a branched propylene polymer The present invention moreover relates to a process for the preparation of blown films which have improved mechanical properties, this process comprising the use of the said compositions.

A further aspect of the present invention moreover relates to the blown films obtained from the said compositions.

The blown films sector constitutes an area of ever-increasing importance in the field of polyolefin films. The reason for this is that the films obtained by blowing have a tubular shape which makes them particularly advantageous in the production of bags for a wide variety of uses (bags for urban refuse, bags used in the storage of industrial materials, for frozen foods, carrier bags, etc.) as the tubular structure enables the number of welding joints required for formation of the bag to be reduced when compared with the use of flat films, with consequent simplification of the process. Moreover, the versatility of the blown-film technique makes it possible, simply by varying the air-insufflation parameters, to obtain tubular films of various sizes, therefore avoiding having to trim the films down to the appropriate size as is necessary in the technique of extrusion through a flat head.

The polyolefin material mainly used in the production of blown films is polyethylene, understood as LDPE, LLDPE or mixtures thereof, since they are endowed with properties in the molten state which enable films to be obtained with a high level of production efficiency, and in a very wide thickness range, without compromising the stability of the bubble. In contrast with these excellent properties of processability, polyethylene-based films have mechanical properties that are not as good, thereby making it necessary in certain particular applications such as, for example, bags used to store industrial materials, to use quite thick (180–200$\mu$) tubular films with a consequent increase in costs. This is because lower thicknesses would not allow the bags to be filled with materials at temperatures above room temperature without undergoing deformations which would compromise the stability of stacks made of bags placed one on top of another. The same problem of stability may be encountered in storage during summer, when room temperatures may be high enough to lead to deformation of the bags.

The use in these applications of blown films obtained from polypropylene-based polymers, on the other hand, is particularly difficult given the poor processability properties of polypropylene which give rise to frequent tearing of the bubble or, in any case, to excessive orientation of the film, resulting in an impact strength which is so low as to render it unusable.

It is therefore seen that there is a need for a polyolefin material which at the same time is of good processability on blown-film production lines and is capable of providing films with mechanical properties that are such as to allow a reduction of thickness when compared with polyethylene-based films.

It has now been found, surprisingly, that polyolefin compositions comprising:

(A) a polyolefin composition having:
  (A1) a fraction which is insoluble in xylene at room temperature, comprising a substantially linear propylene (co)polymer, and
  (A2) a fraction which is soluble in xylene at room temperature, comprising a substantially linear ethylene copolymer; and
(B) a propylene polymer with a branching number of less than 1, are capable of satisfying this requirement.

The said compositions are characterized in that they comprise:

(A) from 50 to 99% of a polyolefin composition having:
  (A1) 35–80 parts by weight of a fraction which is insoluble in xylene at room temperature, comprising a substantially linear propylene homopolymer and/or a substantially linear copolymer of propylene with ethylene and/or another $\alpha$-olefin $CH_2=CHR^I$, where $R^I$ is an alkyl radical having 2–10 carbon atoms, this fraction containing more than 85% by weight of units derived from propylene; and
  (A2) 20–65 parts by weight of a fraction which is soluble in xylene at room temperature, comprising a substantially linear amorphous copolymer of ethylene with propylene and/or another $\alpha$-olefin $CH_2=CHR^I$, where $R^I$ has the meaning described above, this fraction optionally containing smaller proportions of a diene, and containing more than 15% by weight of units derived from ethylene; and
(B) from 1 to 50% by weight of a propylene polymer with a branching number of less than 1.

The heterogeneous polyolefin composition (A) may conveniently be prepared by sequential polymerization, working in at least two stages; in a first stage, a crystalline propylene homopolymer and/or copolymer with an isotactic index of greater than 85 is prepared, and, in a second stage, mixtures of ethylene, propylene and/or an $\alpha$-olefin $CH_2=CHR^I$ are polymerized to give a predominantly amorphous copolymer. The composition (A) is preferably present in amounts ranging from 70 to 99%, more preferably from 80 to 95%, by weight relative to the total weight of (A)+(B).

The fraction (A1) which is insoluble in xylene preferably comprises a substantially linear propylene homopolymer and/or a substantially linear copolymer of propylene, preferably with ethylene, containing more than 90% by weight of units derived from propylene. The amount of the fraction (A1) is preferably between 40 and 75 parts by weight, more preferably between 50 and 70 parts by weight.

The fraction (A2) which is soluble in xylene preferably comprises a copolymer of ethylene with propylene, optionally containing smaller proportions of a diene, containing more than 20% by weight of units derived from ethylene and preferably having an intrinsic viscosity of between 1.5 and 4 dl/g. The amount of fraction (A2) which is soluble in xylene is preferably between 25 and 60, more preferably between 30 and 50, parts by weight.

Examples of heterogeneous polyolefin compositions and methods for preparing them are described in U.S. Pat. No. 4,521,566, EP-A-400,333 and EP-A-472,946, the description of which is incorporated herein by way of reference.

A particularly preferred aspect of the invention consists of polyolefin compositions comprising (A) and (B) as described above in which the composition (A) is obtained by mixing:

(A') a first heterogeneous polyolefin composition having:
  (A'1) 75–95% by weight of a fraction which is insoluble in xylene at room temperature, comprising a substantially linear propylene homopolymer or a substantially linear copolymer of propylene with ethylene and/or another α-olefin $CH_2=CHR^I$, where $R^I$ is an alkyl radical having from 2 to 10 carbon atoms, this fraction containing more than 85% by weight of units derived from propylene; and (A'2) from 5 to 25% by weight of a fraction which is soluble in xylene at room temperature, comprising a substantially linear amorphous copolymer of ethylene with propylene and/or another α-olefin $CH_2=CHR^I$, where $R^I$ has the meaning described above, this fraction optionally containing smaller proportions of a diene and containing more than 15% by weight of units derived from ethylene; and (A") a second heterogeneous polyolefin composition comprising:

(A"1) from 30 to 75% by weight of a fraction which is insoluble in xylene at room temperature, comprising a substantially linear propylene homopolymer or a substantially linear copolymer of propylene with ethylene and/or another α-olefin $CH_2=CHR^I$, where $R^I$ is an alkyl radical having 2–10 carbon atoms, this fraction containing more than 85% by weight of units derived from propylene; and (A"2) from 25 to 70% by weight of a fraction which is soluble in xylene at room temperature, comprising a substantially linear amorphous copolymer of ethylene with propylene and/or another α-olefin $CH_2=CHR^I$, where $R^I$ has the meaning described above, this fraction optionally containing smaller proportions of a diene and containing more than 15%, preferably between 15 and 40%, by weight of units derived from ethylene, the total amount of (A'1) and (A"1) being between 35 and 80 parts by weight while the total amount of (A'2) and (A"2) is between 20 and 65 parts by weight.

The heterogeneous compositions (A') and (A") may be prepared as described above for the composition A. Examples of heterogeneous polyolefin compositions (A') and methods for preparing them are described in U.S. Pat. No. 4,521,566 already mentioned, while examples of heterogeneous polyolefin compositions (A") and methods for preparing them are described in EP-A-400,333 and EP-A-472,946 already mentioned.

The component (B) of the present invention may be any propylene polymer with a branching number of less than 1, preferably of between 0.1 and 0.9, and more preferably of between 0.2 and 0.7. Generally, the said polymers have a melt strength of between 5 and 40 cN, preferably of between 10 and 35 cN and more preferably of between 15 and 30 cN.

The term "propylene polymer" used of the component (B) of the present invention comprises a propylene homopolymer or propylene copolymers containing up to 40% by weight, preferably between 1 and 30%, more preferably between 2 and 20%, of ethylene and/or another α-olefin $CH_2=CHR^I$, where $R^I$ has the meaning described above.

The branching number (g) of the component (B) of the present invention is defined by the ratio $[\eta]_{Br}/[\eta]_{Lin}$ where $[\eta]_{Br}$ and $[\eta]_{Lin}$ are, respectively, the intrinsic viscosity (determined in tetrahydronaphthalene (THN) at 135° C.) of a branched polymer and of a corresponding linear polymer having the same molecular weight (Mw).

The branched propylene polymer which constitutes the component (B) of the present invention may be prepared by many techniques, starting from the corresponding linear polymers. In particular, it may be prepared by subjecting a linear polymer to a process of controlled modification which takes place by means of free radicals generated by peroxide initiators or by means of radiation. Examples of such processes and of the products obtained are described in American patents U.S. Pat. No. 4,916,198, U.S. Pat. No. 5,047,446 and U.S. Pat. No. 5,047,485, the descriptions of which are to be understood as included herein by way of reference.

The compositions of the present invention may be prepared using technologies known in the art, such as the mechanical mixing of the two components (A) and (B) using high-shear internal mixers of the Banbury type, or by mixing directly in the extruder.

If compositions (A') and (A") described above are used, they may be mixed separately to form the polyolefin composition (A) of the present invention. Alternatively, the compositions (A') and (A") and the component B may be mixed together, in a mixer or directly in the extruder, to form the composition (A)+(B) of the present invention.

As described above, the compositions of the present invention are used in the process for the preparation of mono- or multilayer blown films, by which process films having improved mechanical properties are obtained. The said films may be prepared by the processes and with the related equipment generally used in the technique of blown films according to that which is known to those skilled in the art.

Obviously, the compositions according to the invention may contain additives capable of imparting specific properties to the articles which the composition is intended to produce. Additives which may be used are those conventionally used in thermoplastic polymer compositions such as, for example, stabilizers, antioxidants, anti-corrosion agents, antislip agents, antiblocking agents, etc.

The compositions of the invention may moreover contain inorganic or organic, including polymeric, fillers. The abovementioned additives and fillers may be used in conventional amounts, as is known by those skilled in the art or as may readily be determined by routine tests, generally in amounts up to 5% by weight of the final composition.

The optional additives do not modify the weight ranges described for the components of the present invention which are to be understood as relative weight ratios between the components (A1), (A2), (B) or (A'1), A'2), (A"1), (A"2) and (B).

When used in the process for the preparation of blown films, the compositions of the present invention are surprisingly processable. Indeed, the compositions A+B allowed an increase in the throughput of the extruder without any problems of bubble instability being encountered. Consequently, under the same process conditions, about a 25% improvement in production efficiency was found when compared with that of compositions in which the component B is absent, and essentially in line with the production efficiency obtained using LDPE; in particular, it was seen that, under the same conditions, the ratio between the production efficiency obtained using the compositions of the invention and the production efficiency obtained with LDPE is equal to or greater than 0.9.

The blown films obtained with compositions (A)+(B) according to the present invention have improved mechanical properties both with respect to the films obtained from LDPE and with respect to the films obtained from compositions in which component B is absent. In particular, the said films have very much greater resistance to deformation (given in the examples as Effective Load at Yield which expresses the force required to effect the yield at a given temperature), both with respect to LDPE films of greater thickness and with respect to films obtained from compositions (A) alone. For values in the Dart test of greater than 500 g, which constitutes the safety limit for applications of the industrial bag type, the films of the invention moreover possess improved properties also in terms of tensile modulus and load at yield.

EXAMPLES

The properties indicated were determined according to the following methods:

Composition of the polymers: weight percentage of the various monomers determined by I.R.;

Insolubility in xylene: 2 g of polymer are dissolved in 250 cm$^3$ of xylene at 135° C. with stirring. After 20 minutes the solution is left to cool with continued stirring until it reaches a temperature of 25° C. After 30 minutes the insoluble polymer precipitated is separated out by filtration. The solvent is removed from the solution by evaporation under a stream of nitrogen and the residue is dried under vacuum at 80° C. until the weight remains constant. In this way, the percentage of polymer soluble in xylene at 25° C. is calculated and, consequently, the percentage of insoluble polymer is determined;

Melt strength: The method consists in measuring the resistance of a "thread" of molten polymer, working at a specific drawing speed. The polymer is extruded at 200° C. through a circular slot with a diameter of 1 mm; the polymer is then drawn at a constant acceleration of 0.0012 cm/sec$^2$, with the resistance offered being measured using an instrument for measuring the force of the molten material (Rheotens melt tension instrument model 2001 produced by Gottfert) which records the force as a function of drawing. The test is continued to the breaking point and the maximum value measured corresponds to the melt strength.

Heat of fusion: ASTM D 3418-82;

Density: ASTM D 1505;

Melt Index E (MIE): ASTM D 1238, condition E;

Melt Index F (MIF): ASTM D 1238, condition F;

Melt Index L (MIL): ASTM D 1238, condition L;

F/E: ration between the Melt Index F and the Melt Index E;

Elmendorf Tear Strength: ASTM D 1922, determined both in the direction of the machine (MD) and in the transverse direction (TD);

Elongation at yield: ASTM D 882

Load at yield: ASTM D 882

Tensile modulus: ASTM D 882

Effective load at yield: Traction tests carried out according to ASTM D 882, giving the values of the load at yield (expressed in N).

Example 1

A blown film 100 μm in thickness was prepared using a line comprising a Dolci KR40 single-screw extruder with a Maddock homogenizer having the following characteristics: L/D=26; compression rate=1.5. The composition used (pelletized) was made up of 90% of a composition (A) containing:

(A'1) about 88% of a fraction which is insoluble in xylene, containing a propylene homopolymer with an isotactic index of greater than 90;

(A'2) about 12% of a fraction soluble in xylene, containing an ethylene/propylene copolymer containing about 5% ethylene;

(A"1) 35% of a fraction which is insoluble in xylene, containing a propylene/ethylene copolymer containing about 3% ethylene;

(A"2) about 65% of a fraction which is soluble in xylene, containing an ethylene/propylene copolymer containing about 30% ethylene; where the sum of A'1 and A"1 is equal to 63 parts by weight and the sum of A'2 and A"2 is equal to 37 parts by weight;

and 10% of the component (B) comprising a propylene homopolymer having a branching number of 0.56, a melt strength of 23 cN and a melt index (MIL) of 5 dg/min.

The extrusion conditions used were as follows: Barrel temp. 190–220° C.; head temp. 220° C.; blowing ratio 2.5; extruder speed 100 rpm. Slot aperture 1.2 mm.

The results of the tests to which the film was subjected are given in Table 1.

Example 2 (Comparative)

A blown film 100 μm in thickness was produced using the apparatus and the conditions described in Example 1. The same composition as in Example 1 was used (pelletized), replacing the amount of absent component (B) with composition A". The results of the tests to which the film was subjected are given in Table 1.

Example 3

A blown film 100 μm in thickness was produced using the apparatus and the conditions described in Example 1. A composition was used (in dry-blend form) containing 96% of composition (A) of Example 1 and 4% of component (B) of Example 1. The results of the tests to which the film was subjected are given in Table 1.

Example 4

A blown film 100 μm in thickness was produced using the apparatus and the conditions described in Example 1. The same composition was used as in Example 1 (in dry-blend form), containing 92% of composition (A) and 8% of component (B). The results of the tests to which the film was subjected are given in Table 1.

Example 5

A blown film 100 μm in thickness was produced using the apparatus and the conditions described in Example 1. A composition was used (in dry-blend form) containing 96% of composition (A) of Example 1 and 4% of a component (B) having a branching number of 0.56, a melt strength of 23 cN and a melt index (MIL) of 2 dg/min. The results of the tests to which the film was subjected are given in Table 1.

Example 6

A blown film 100 μm in thickness was produced using the apparatus and the conditions described in Example 1. A composition was used (in dry-blend form) containing 92% of composition (A) of Example 1 and 8% of a component (B) having a branching number of 0.56, a melt strength of 23 cN and a melt index (MIL) of 2 dg/min. The results of the tests to which the film was subjected are given in Table 1.

Example 7 (Comparative)

A blown film 100 µm in thickness was produced using the apparatus and the conditions described in Example 1. The same composition as in Example 1 was used (in dry-blend form), replacing the amount of absent component (B) with composition A". The results of the tests to which the film was subjected are given in Table 1.

Example 8

A blown film 100 µm in thickness was produced using the apparatus and the conditions described in Example 1. The composition used consisted of 90% of a composition (A) containing:
(A'1) about 88% of a fraction which is insoluble in xylene, containing a propylene homopolymer with an isotactic index of greater than 90;
(A'2) about 12% of a fraction which is soluble in xylene, containing an ethylene/propylene copolymer containing about 5% ethylene;
(A"1) 37% of a fraction which is insoluble in xylene, containing a propylene/ethylene copolymer containing about 3% ethylene;
(A"2) about 63% of a fraction which is soluble in xylene, containing an ethylene/propylene copolymer containing about 30% ethylene; where the sum of A'1 and A"1 is equal to 64 parts by weight and the sum of A'2 and A"2 is equal to 26 parts by weight;
and 10% of component (B) comprising a propylene homopolymer with a branching number of 0.56, a melt strength of 23 cN and an MIL of 5 dg/min. The results of the tests to which the film was subjected are given in Table 1.

Example 9 (Comparative)

A blown film 100 µm in thickness was produced using the apparatus and the conditions described in Example 1. The same composition was used as in Example 8, replacing the amount of the absent component (B) with the composition A". The results of the test to which the film was subjected are given in Table 1.

Example 10

A film 140 µm in thickness was obtained using the composition of Example 8 and the apparatus and conditions described in Example 1, but using a blowing ratio of 2. The film thus obtained was subjected to mechanical tests at temperatures of 50 and 75° C. to evaluate the behaviour of bags produced from the said film when subjected to filling with hot materials and/or storage at summer temperatures. The results are given in Table 2.

Example 11 (Comparative)

A film 140 µm in thickness was obtained using the composition of Comparative Example 9 and the apparatus and conditions described in Example 1, but using a blowing ratio of 2. The results of the mechanical tests at 50 and 70° C. are given in Table 2.

Example 12 (Comparative)

A one-layer film 180 µm in thickness was obtained using a blend consisting of 80% LDPE and 20% LLDPE modified with 1-butene. The results of the mechanical tests at 50 and 70° C. are given in Table 2.

Example 13 (Comparative)

A three-layer film 200 µm in thickness consisting of LDPE/LLDPE/LDPE, named as "Hot Filling" and marketed by BONAR was subjected to the mechanical tests at 50 and 70° C. as in the above examples. The results are given in Table 2.

Example 14

A series of tests intended to determine the maximum production efficiency of the process for the preparation of the film by blowing depending on the composition used was carried out with the compositions shown below and using a Dolci extruder with an L/D ratio=30, compression rate >2.5 and a slot aperture of between 0.8 and 1.2 depending on the thickness of the films, which were between 100 and 150 µm.

The maximum production efficiency was calculated based on the maximum speed which could be applied to the extruder without the bubble becoming unstable.

The following results were obtained:

| Composition | Production efficiency (kg/h) |
|---|---|
| EXAMPLE 2 (comparative) | 120 |
| EXAMPLE 1 | 155 |
| LDPE | 165 |

TABLE 1

|  |  | Ex. 1 | Ex. 2 (comp.) | Ex. 3 | Ex. 4 | Ex. 5 | Ex. 6 | Ex. 7 (comp.) | Ex. 8 | Ex. 9 (comp.) |
|---|---|---|---|---|---|---|---|---|---|---|
| MET |  |  |  |  |  |  |  |  |  |  |
| MD | MP at | 700 | 650 | 720 | 820 | 740 | 810 | 550 | 710 | 480 |
| TD |  | 620 | 600 | 580 | 660 | 620 | 640 | 480 | 580 | 410 |
| Load at |  |  |  |  |  |  |  |  |  |  |
| yield MD | MP at | 20.7 | 19.1 | 19.6 | 21.4 | 19.9 | 21.3 | 17.4 | 20.5 | 16.4 |
| TD |  | 16.7 | 17.6 | 15.8 | 17.3 | 17 | 16.9 | 14.8 | 16.7 | 13.7 |
| Elongation at |  |  |  |  |  |  |  |  |  |  |
| yield MD | % | 29 | 24 | 24 | 24 | 25 | 26 | 28 | 30 | 36 |
| TD |  | 22 | 20 | 18 | 19 | 22 | 17 | 23 | 21 | 30 |
| Dart | g | >500 | >500 | >500 | >500 | >500 | 500 | >500 | >500 | >500 |

TABLE 2

|  | | Example 10 | | Example 11 (Comparative) | | Example 12 (Comparative) | | Example 13 (Compartive) | |
|---|---|---|---|---|---|---|---|---|---|
|  |  | MD | TD | MD | TD | MD | TD | MD | TD |
| Tensile modulus | | | | | | | | | |
| 50° C. | MPa | 380 | 280 | 270 | 260 | 80 | 90 | 120 | 130 |
| 75° C. |  | 250 | 210 | 180 | 160 | 40 | 45 | 60 | 60 |
| Load at yield | | | | | | | | | |
| 50° C. | MPa | 12.1 | 10.8 | 10.1 | 9.1 | 5.9 | 5.8 | 7 | 7 |
| 75° C. |  | 7.8 | 6.7 | 6.2 | 5.6 | n.d. | 3.5 | 4.4 | 4.1 |
| Effective load at yield | | | | | | | | | |
| 50° C. | N | 23 | 21 | 17 | 14 | 14 | 14 | 18 | 18 |
| 75° C. |  | 15 | 13 | 10 | 9 | n.d. | 8 | 12 | 12 |
| Dart at 23° C. | g | 740 | | 800 | | 350 | | 370 | |

What is claimed is:

1. Blown films, comprising a polyolefin composition comprising:
   (A) from 70% to 99% of a polyolefin composition having:
   (A1) 35–85 parts by weight of a fraction which is insoluble in xylene at room temperature, comprising a substantially linear propylene homopolymer and/or a substantially linear copolymer of propylene with ethylene and/or another α-olefin $CH_2=CHR^I$, where $R^I$ is an alkyl radical having 2–10 carbon atoms, this fraction containing more than 85% by weight of units derived from propylene; and
   (A2) 20–65 parts by weight of a fraction which is soluble in xylene at room temperature, comprising a substantially liner amorphous copolymer of ethylene with propylene and/or another α-olefin $CH_2=CHR^I$, where $R^I$ has the meaning described above, this fraction optionally containing smaller proportions of a diene, and containing more than 15% by weight of units derived from ethylene; and
   (B) from 1 to 30% by weight of a propylene polymer with a branching number less than 1.

2. Polyolefin compositions according to claim 1, in which the composition (A) is present in amounts ranging from 70 to 99%, more preferably from 80 to 95%, by weight relative to the total of (A)+(B).

3. Blown films according to claim 1, in which the fraction (A1) which is insoluble in xylene comprises a substantially linear propylene homopolymer and/or a substantially linear copolymer of propylene, preferably with ethylene, this fraction containing more than 90% by weight of units derived from propylene.

4. Blown films according to claim 3, in which the amount of fraction (A1) is preferably between 40 and 75 parts by weight, more preferably between 50 and 70 parts by weight.

5. Blown films according to claim 1, in which the fraction (A2) which is soluble in xylene comprises a copolymer of ethylene with propylene, optionally containing smaller proportions of a diene, containing more than 20% by weight of units derived from ethylene and preferably having an intrinsic viscosity of between 1.5 and 4 dl/g.

6. Blown films according to claim 5, in which the amount of fraction (A2) which is soluble in xylene is preferably between 25 and 60, more preferably between 30 and 50, parts by weight.

7. Blown films according to claim 1, in which the composition (A) comprises:
   (A') a first heterogeneous polyolefin composition having:
   (A'1) 75–95 parts by weight of a fraction which is insoluble in xylene at room temperature, comprising a substantially linear propylene homopolymer and/or a substantially linear copolymer of propylene with ethylene and/or another α-olefin $CH_2=CHR^I$, where $R^I$ is an alkyl radical having from 2 to 10 carbon atoms, this fraction containing more than 85% by weight of units derived from propylene; and
   (A'2) from 5 to 25 parts by weight of a fraction which is soluble in xylene at room temperature, comprising a substantially linear amorphous copolymer of ethylene with propylene and/or another α-olefin $CH_2=CHR^I$, where $R^I$ has the meaning described above, this fraction optionally containing smaller proportions of a diene and containing more than 15% by weight of units derived from ethylene; and
   (A") a second heterogeneous polyolefin composition comprising:
   (A"1) from 30 to 75% by weight of a fraction which is insoluble in xylene at room temperature, comprising a substantially linear propylene homopolymer and/or a substantially linear copolymer of propylene with ethylene and/or another α-olefin $CH_2=CHR^I$, where $R^I$ is an alkyl radical having 2–10 carbon atoms, this fraction containing more than 85% by weight of units derived from propylene; and
   (A"2) from 25 to 70 parts by weight of a fraction which is soluble in xylene at room temperature, comprising a substantially linear amorphous copolymer of ethylene with propylene and/or another α-olefin $CH_2=CHR^I$, where $R^I$ has the meaning described above, this fraction optionally containing smaller proportions of a diene and containing more than 15% by weight, preferably between 15 and 40% by weight, of units derived from ethylene; the total amount of (A'1) and (A"1) in the said compositions (A') and (A") being between 35 and 80 parts by weight and the total amount of (A'2) and (A"2) between 20 and 65 parts by weight.

8. Blown films according to claim 1, in which the component (B) is a propylene polymer with a branching number of less than 1, preferably of between 0.1 and 0.9 and more preferably of between 0.2 and 0.7.

9. Blown films according to claim 1, in which the component (B) has a melt strength of between 5 and 40 cN, preferably of between 10 and 35 cN and more preferably of between 15 and 30 cN.

10. Process for the preparation of blown films, comprising the use of a polyolefin composition according to claim 1.

* * * * *

UNITED STATES PATENT AND TRADEMARK OFFICE
CERTIFICATE OF CORRECTION

PATENT NO.    : 6,211,295 B1
DATED         : April 3, 2001
INVENTOR(S)   : Emanuele Burgin, Claude Palate, Pierce Coosemans Page 1 of 1

It is certified that error appears in the above-identified patent and that said Letters Patent is hereby corrected as shown below:

Claim 2, column 9,
Line 42, change "Polyolefin compositions" to -- Blown films --.

Title page
Please list the following patents under the References Cited section:

| | |
|---|---|
| 4,521,566 | 5,047,485 |
| 4,916,198 | EP-A-400,333 |
| 5,047,446 | EP-A-472,946 |

Signed and Sealed this

Eleventh Day of September, 2001

Attest:

Nicholas P. Godici

NICHOLAS P. GODICI
*Attesting Officer*    *Acting Director of the United States Patent and Trademark Office*